US011985707B2

(12) United States Patent
Ratilainen et al.

(10) Patent No.: US 11,985,707 B2
(45) Date of Patent: May 14, 2024

(54) EXTENDED RANDOM ACCESS PREAMBLE IDENTIFIER FOR ENHANCED RANDOM ACCESS CHANNEL

(71) Applicant: Telefonaktiebolaget LM Ericsson (publ), Stockholm (SE)

(72) Inventors: Antti Ratilainen, Espoo (FI); Andreas Höglund, Solna (SE); Olof Liberg, Stockholm (SE); Yutao Sui, Solna (SE); Emre Yavuz, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 163 days.

(21) Appl. No.: 16/976,153

(22) PCT Filed: Apr. 4, 2019

(86) PCT No.: PCT/IB2019/052784
§ 371 (c)(1),
(2) Date: Aug. 27, 2020

(87) PCT Pub. No.: WO2019/193548
PCT Pub. Date: Oct. 10, 2019

(65) Prior Publication Data
US 2021/0014901 A1 Jan. 14, 2021

Related U.S. Application Data

(60) Provisional application No. 62/653,411, filed on Apr. 5, 2018.

(51) Int. Cl.
*H04W 74/08* (2009.01)
*G16Y 10/75* (2020.01)
(Continued)

(52) U.S. Cl.
CPC ......... *H04W 74/0833* (2013.01); *G16Y 10/75* (2020.01); *H04L 69/22* (2013.01); *H04W 80/02* (2013.01); *H04W 84/042* (2013.01)

(58) Field of Classification Search
CPC ............. H04W 74/0833; H04W 80/02; H04W 84/042; H04W 74/004; H04W 74/006; G16Y 10/75; H04L 69/22
See application file for complete search history.

(56) References Cited

U.S. PATENT DOCUMENTS

2009/0175253 A1* 7/2009 Wu ........................ H04W 99/00
370/338
2009/0201798 A1* 8/2009 Lee ..................... H04W 74/002
370/216
(Continued)

OTHER PUBLICATIONS

Vivo "Remaining issue for RAR", 3GPP R2-1710962, Oct. 9-13, 2017 (Year: 2017).*
(Continued)

*Primary Examiner* — Harry H Kim
*Assistant Examiner* — Chuong M Nguyen
(74) *Attorney, Agent, or Firm* — Baker Botts L.L.P.

(57) ABSTRACT

A method is performed by a network node. The method comprises determining to use an extended random access preamble identifier, RAPID, for a random access procedure with a wireless device. The method further comprises transmitting a medium access control, MAC, protocol data unit, PDU. The MAC PDU comprises a header and one or more random access responses, RARs. Each RAR is associated with a corresponding subheader within the header of the MAC PDU. The random access procedure is associated with a first RAR of the one or more RARs and the extended RAPID for the random access procedure is indicated by a combination of one or more bits in the first RAR and one or more bits in the subheader that corresponds to the first RAR.

24 Claims, 12 Drawing Sheets

(51) Int. Cl.
*H04L 69/22* (2022.01)
*H04W 74/0833* (2024.01)
*H04W 80/02* (2009.01)
*H04W 84/04* (2009.01)

(56) References Cited

U.S. PATENT DOCUMENTS

| | | | | |
|---|---|---|---|---|
| 2011/0170503 A1* | 7/2011 | Chun | ............... | H04W 74/006 |
| | | | | 370/329 |
| 2012/0082103 A1* | 4/2012 | Lin | ............... | H04W 74/085 |
| | | | | 370/328 |
| 2013/0114516 A1* | 5/2013 | Koo | ............... | H04B 15/00 |
| | | | | 455/501 |
| 2015/0296542 A1* | 10/2015 | Heo | ............... | H04W 74/0833 |
| | | | | 370/329 |
| 2016/0198497 A1* | 7/2016 | Yu | ............... | H04W 72/0446 |
| | | | | 370/330 |
| 2018/0279376 A1* | 9/2018 | Dinan | ............... | H04W 52/50 |

OTHER PUBLICATIONS

Samsung "Random Access in NR: RAR MAC Subheader Design," 3GPP R2-1710080, Oct. 9-13, 2017 (Year: 2017).*
3GPP TSG RAN WG1 Meeting NR#3; Nagoya, Japan; Source: CATT: Title: Further details on NR 4-step RA Procedure (R1-1715790)—Sep. 18-21, 2017.
3GPP TSG-RAN WG2 Meeting #99bis; Portugal, Czech Republic; Source: vivo; Title: Remaining issue for RAR (R2-1710962)—Oct. 9-13, 2017.
3GPP TSG-RAN WG2 #101; Athens, Greece; Source: Ericsson; Title: NPRACH reliability and range enhancement in NB-IoT (R2-1803696)—Feb. 26-Mar. 2, 2018.
PCT International Search Report for International application No. PCT/IB2019/052784—Jun. 21, 2019.
PCT Written Opinion of the International Searching Authority issued for International application No. PCT/IB2019/052784—Jun. 21, 2019.
3GPP TS 36.321 v15.1.0; Technical Specification; 3rd Generation Partnership Project; Technical Specification Group Radio Access Network; Evolved Universal Terrestrial Radio Access (E-UTRA); Medium Access Control (MAC) protocol specification (Release 15)—2018.
Patent Office Notice of Submission of Opinions issued by the Korean Intellectual Property Office for Application No. 10-2020-7028454—Sep. 16, 2021.
3GPP TS 36.321 v13.8.0; Technical Specification; 3rd Generation Partnership Project; Technical Specification Group Radio Access Network; Evolved Universal Terrestrial Radio Access (E-UTRA); Medium Access Control (MAC) protocol specification (Release 13)—Mar. 2018.
TS36.331 V15.1.0 (Mar. 2018) 3rd Generation Partnership Project; Technical Specification Group Radio Access Network; Evolved Universal Terrestrial radio Access (E-UTA)'Radio Resource Control (RRC); Protocol specification (Release 15).
3GPP TSG RAN WG1 NR Ad-Hoc#3, "Remaining details on RACH procedure," R1-1716155, Sep. 18-21, 2017.
3GPP TSG RAN WG1 Meeting #91, "Remaining issues in RACH formals," R1-1719375, Nov. 27-Dec. 1, 2017.
3GPP TSG RAN WG1 Meeting 91, Summary of Remaining Details on RACH Procedure, R1-1721553, Nov. 27-Dec. 1, 2017.

* cited by examiner

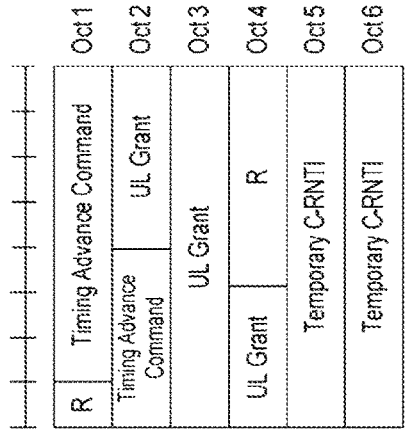
FIG. 1A
FIG. 1B
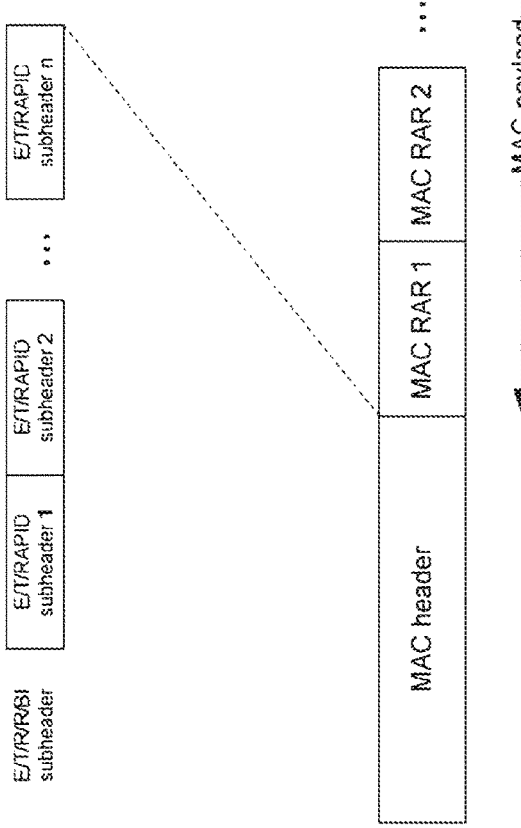
FIG. 2

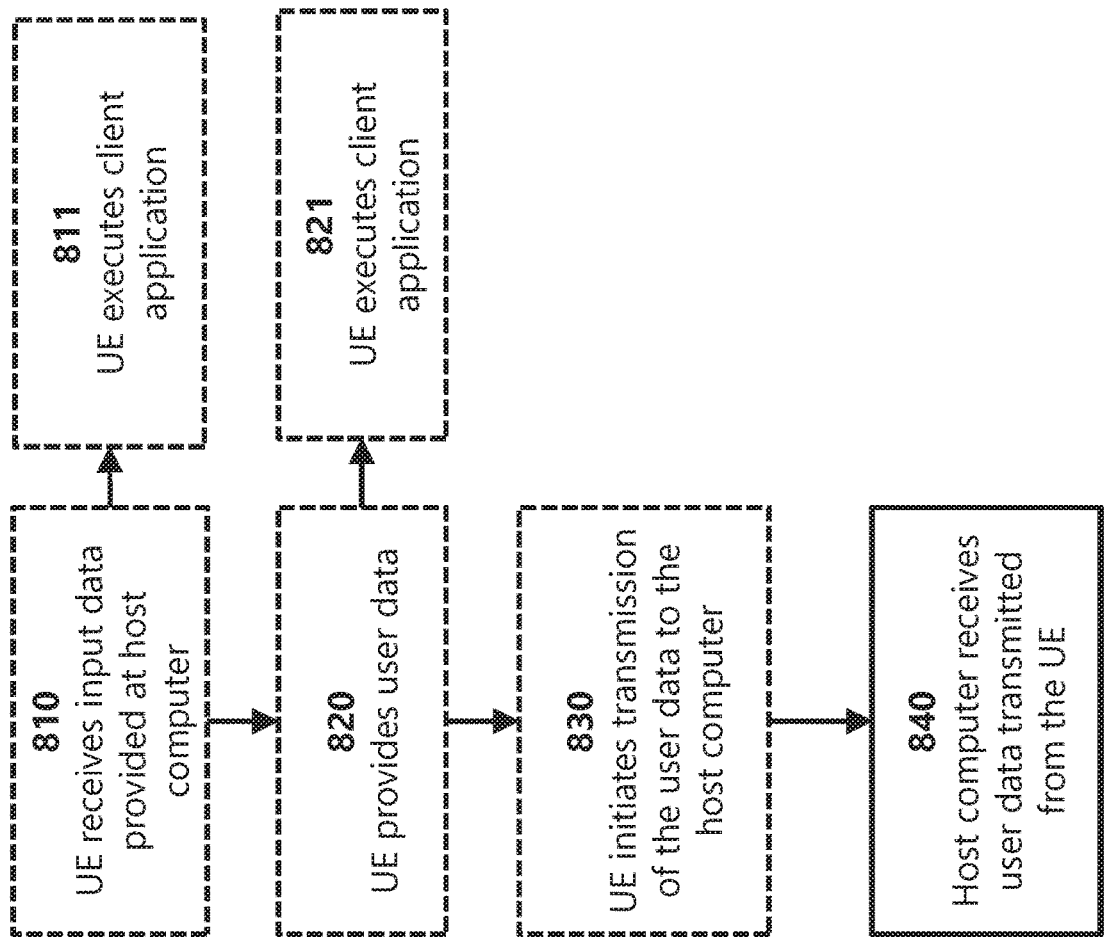

EXTENDED RANDOM ACCESS PREAMBLE IDENTIFIER FOR ENHANCED RANDOM ACCESS CHANNEL

PRIORITY

This nonprovisional application is a U.S. National Stage Filing under 35 U.S.C. § 371 of International Patent Application Serial No. PCT/IB2019/052784 filed Apr. 4, 2019 and entitled "Extended Random Access Preamble Identifier for Enhanced Random Access Channel" which claims priority to U.S. Provisional Patent Application No. 62/653,411 filed Apr. 5, 2018 both of which are hereby incorporated by reference in their entirety.

TECHNICAL FIELD

Certain embodiments of the present disclosure relate, in general, to wireless communications and, more particularly, to random access preamble IDs for random access channels.

BACKGROUND

The Third Generation Partnership Project (3GPP) is a standards organization which develops specifications for mobile telephony, which include Radio Access Network (RAN) specifications. In RAN #75, it was agreed to have a Release 15 Work Item (WI) called "Further NB-IoT enhancements." As part of this WI, the following objective was agreed:

Narrowband Physical Random Access Channel (NPRACH) Reliability and Range Enhancements
If found necessary, reduce false alarm probability for NPRACH detection due to inter-cell interference on NPRACH [RAN1, RAN2, RAN4]
If found necessary, introduce at least additional cyclic prefixes (CPs) for NPRACH to support cell radius of at least 100 km [RAN1, RAN2, RAN4]

The objective is driven by RAN1 and the solution is highly dependent on agreements in RAN1. Work for NPRACH reliability and range enhancement has commenced in RAN1 discussions. The agreements from RAN1 #89 for NPRACH cell range enhancements are the following:

Agreements:
To support of cell range of at least 100 km, for further study (FFS) between:
Cat 1: Rel-13 NPRACH
Cat 2: Sharing the same NPRACH resources as Rel-13 NPRACH formats, with symbol or symbol-group level scrambling; maintaining feasibility of FFT processing and orthogonality of preambles on different tones
CP length FFS between same as or longer than Rel-13 formats
Cat 3: New NPRACH numerology with CP length FFS between same as or longer than Rel-13 formats
Option A: 1.25 kHz subcarrier spacing with minimum hop distance of 1.25 kHz
Option B: 3.75 kHz subcarrier spacing with minimum hop distance 1.25 kHz
Option C: 3.75 kHz subcarrier spacing with minimum hop distance 3.75 kHz with new hopping pattern
Combinations of Category 2 and Category 3 solutions are not precluded And the agreements from RAN1 #89 for NPRACH false alarm enhancements are the following:

Agreements:
For reduction of NPRACH false alarm probability, FFS between:
Alt 1: Sharing the same NPRACH resources as Rel-13 NPRACH formats, with symbol or symbol-group level scrambling; maintaining feasibility of FFT processing and orthogonality of preambles on different tones
Alt 2: A frequency shift of k*0.75 kHz is applied to all NPRACH signal in a Cell.
FFS k=[−2, −1, 0, 1, 2] or [−2, −1 1 2].
FFS if to apply a phase rotation of m*pi/2 with m=0,1,2,3 is applied to the 4th symbol group of each repetition.
Signaling of the above frequency shift and phase rotation is FFS.
Alt 3: 3.75 kHz subcarrier spacing with minimum hop distance 3.75 kHz with new hopping pattern
Combinations of the above alternatives are not precluded NPRACH reliability and range enhancements were also discussed in RAN1 #92, and the following agreements were made:

Agreements:
For NPRACH range enhancements,
New NPRACH numerology with 1.25 kHz subcarrier spacing with minimum hop distance of 1.25 kHz.
Only 800 us CP length is supported As can be seen above, a new numerology for the NPRACH range enhancements was agreed, with 1.25 kHz subcarrier spacing and a minimum hop distance of 1.25 kHz. In legacy NB-IoT physical random access channel (NPRACH), the subcarrier spacing is 3.75 kHz, resulting in 48 subcarriers in one physical resource block (PRB). With 1.25 kHz subcarrier spacing, the number of subcarriers for the new NPRACH in one PRB is extended to up to 144. Previously, 6 bits in the Medium Access Control (MAC) header for Random Access Response (RAR) were used to identify the Random Access Preamble ID (RAPID).

Below is a description of a MAC protocol data unit (PDU) (focusing on RAR message) from $3^{rd}$ Generation Partnership Project (3GPP) TS 36.321:

A MAC PDU consists of a MAC header and zero or more MAC Random Access Responses (MAC RAR) and optionally padding as described in FIG. 6.1.5-4 (reproduced as FIG. 2).

The MAC header is of variable size.

A MAC PDU header consists of one or more MAC PDU subheaders; each subheader corresponding to a MAC RAR except for the Backoff Indicator subheader. If included, the Backoff Indicator subheader is only included once and is the first subheader included within the MAC PDU header.

A MAC PDU subheader consists of the three header fields E/T/RAPID (as described in FIG. 6.1.5-1 (reproduced as FIG. 1A) but for the Backoff Indicator subheader which consists of the five header field E/T/R/R/BI (as described in FIG. 6.1.5-2).

A MAC RAR consists of the four fields R/Timing Advance Command/UL Grant/Temporary C-RNTI (as described in FIGS. 6.1.5-3, 6.1.5-3a and 6.1.5-3b (reproduced as FIG. 1B)). For Bandwidth reduced Low complexity (BL) UEs and UEs in enhanced coverage in enhanced coverage level 2 or 3, the MAC RAR in FIG. 6.1.5-3a is used, for NB-IoT UEs, the MAC RAR in FIG. 6.1.5-3b [FIG. 1B] is used, otherwise the MAC RAR in FIG. 6.1.5-3 is used.

Padding may occur after the last MAC RAR. The presence and length of padding is implicit based on TB size, size of MAC header and number of RARs.

6.2.2 MAC Header for Random Access Response

The MAC header is of variable size and consists of the following fields:

E: The Extension field is a flag indicating if more fields are present in the MAC header or not. The E field is set to "1" to indicate at least another set of E/T/RAPID fields follows. The E field is set to "0" to indicate that a MAC RAR or padding starts at the next byte;

T: The Type field is a flag indicating whether the MAC subheader contains a Random Access ID or a Backoff Indicator. The T field is set to "0" to indicate the presence of a Backoff Indicator field in the subheader (BI). The T field is set to "1" to indicate the presence of a Random Access Preamble ID field in the subheader (RAPID);

R: Reserved bit, set to "0";

BI: The Backoff Indicator field identifies the overload condition in the cell. The size of the BI field is 4 bits;

RAPID: The Random Access Preamble IDentifier field identifies the transmitted Random Access Preamble (see subclause 5.1.3). The size of the RAPID field is 6 bits.

The MAC header and subheaders are octet aligned.

NOTE: For NB-IoT, the Random Access Preamble IDentifier field corresponds to the start subcarrier index.

An example of a MAC PDU is illustrated in FIG. 2.

SUMMARY

There currently exist certain challenges. With the new numerology agreed in RAN1 #92, the amount of configurable subcarriers for the new NPRACH enhancements is extended to 144 compared to 48 subcarriers in legacy Narrowband Internet-of-Things (NB-IoT). However, the RAPID definition in the MAC subheader is only 6 bits, which may indicate up to 64 different RAPIDs, each corresponding to one NPRACH subcarrier. There are, proposed herein, various embodiments which address one or more of the issues disclosed herein.

According to an embodiment, a method is provided for use in a network node. The method comprises determining to use an extended random access preamble identifier (RAPID) for a random access procedure with a wireless device. The method further comprises transmitting a medium access control (MAC) protocol data unit (PDU). The MAC PDU comprises a header and one or more random access responses (RARs). Each RAR is associated with a corresponding subheader within the header of the MAC PDU. The random access procedure is associated with a first RAR of the one or more RARs and the extended RAPID for the random access procedure is indicated by a combination of one or more bits in the first RAR and one or more bits in the subheader that corresponds to the first RAR.

According to another embodiment, a network node comprises a memory configured to store instructions and processing circuitry configured to execute the instructions. The network node is configured to determine to use an extended random access preamble identifier (RAPID) for a random access procedure with a wireless device. The network node is further configured to transmit a medium access control (MAC) protocol data unit (PDU). The MAC PDU comprises a header and one or more random access responses (RARs). Each RAR is associated with a corresponding subheader within the header of the MAC PDU. The random access procedure is associated with a first RAR of the one or more RARs and the extended RAPID for the random access procedure is indicated by a combination of one or more bits in the first RAR and one or more bits in the subheader that corresponds to the first RAR.

According to yet another embodiment, a computer program product includes comprises a non-transitory computer readable medium storing computer readable program code. The computer readable program code comprises program code for determining to use an extended random access preamble identifier (RAPID) for a random access procedure with a wireless device. The computer readable program code further comprises program code for transmitting a medium access control (MAC) protocol data unit (PDU). The MAC PDU comprises a header and one or more random access responses (RARs). Each RAR is associated with a corresponding subheader within the header of the MAC PDU. The random access procedure is associated with a first RAR of the one or more RARs and the extended RAPID for the random access procedure is indicated by a combination of one or more bits in the first RAR and one or more bits in the subheader that corresponds to the first RAR.

In certain embodiments, the method/network node/computer program product may have one or more additional and/or optional features:

In particular embodiments, determining to use the extended RAPID is based on a preamble received from the wireless device.

In particular embodiments, determining to use the extended RAPID is based on receiving, from the wireless device, a preamble having a format indicating that the wireless device is capable of obtaining extended RAPID bits from a portion of a random access response that is reserved with respect to legacy wireless devices.

In particular embodiments, the extended RAPID is indicated by a combination of two bits in the first RAR and six bits from the subheader that corresponds to the first RAR.

According to an embodiment, a method is provided for use in a wireless device. The method comprises transmitting a preamble to a network node to initiate a random access procedure. The method further comprises receiving, from the network node, a medium access control (MAC) protocol data unit (PDU). The MAC PDU comprises a header and one or more random access responses (RARs). Each RAR is associated with a corresponding subheader within the header of the MAC PDU. The method further comprises determining one or more extended random access preamble identifiers (RAPIDs) indicated by the MAC PDU. Each extended RAPID is determined from a combination of one or more bits from one of the RARs and one or more bits from the subheader that corresponds to said one of the RARs. The method further comprises determining whether the MAC PDU includes a RAR for the wireless device based on whether any of the one or more extended RAPIDs corresponds to the preamble transmitted by the wireless device.

According to another embodiment, a wireless device comprises a memory configured to store instructions and processing circuitry configured to execute the instructions. The wireless device is configured to transmit a preamble to a network node to initiate a random access procedure. The wireless device is further configured to receive, from the network node, a medium access control (MAC) protocol data unit (PDU). The MAC PDU comprises a header and one or more random access responses (RARs). Each RAR is associated with a corresponding subheader within the header of the MAC PDU. The wireless device is further configured to determine one or more extended random access preamble identifiers (RAPIDs) indicated by the MAC PDU. Each extended RAPID is determined from a combination of one or more bits from one of the RARs and one or more bits from the subheader that corresponds to said one of the RARs. The wireless device is further configured to determine whether the MAC PDU includes a RAR for the wireless device based on whether any of the one or more extended RAPIDs corresponds to the preamble transmitted by the wireless device.

According to yet another embodiment, a computer program product includes comprises a non-transitory computer readable medium storing computer readable program code. The computer readable program code comprises program code for transmitting a preamble to a network node to initiate a random access procedure. The computer readable program code further comprises program code for receiving, from the network node, a medium access control (MAC) protocol data unit (PDU). The MAC PDU comprises a header and one or more random access responses (RARs). Each RAR is associated with a corresponding subheader within the header of the MAC PDU. The computer readable program code further comprises program code for determining one or more extended random access preamble identifiers (RAPIDs) indicated by the MAC PDU. Each extended RAPID is determined from a combination of one or more bits from one of the RARs and one or more bits from the subheader that corresponds to said one of the RARs. The computer readable program code further comprises program code for determining whether the MAC PDU includes a RAR for the wireless device based on whether any of the one or more extended RAPIDs corresponds to the preamble transmitted by the wireless device.

In certain embodiments, the method/wireless device/computer program product may have one or more additional and/or optional features:

In particular embodiments, the transmitted preamble indicates that the wireless device determines the extended RAPID using bits from a portion of a random access response that is reserved with respect to legacy wireless devices.

In particular embodiments, the method/wireless device/computer program product further comprises, if the extended RAPID corresponds to the preamble transmitted to the network node, transmitting a connection request to the network node using an uplink grant indicated in the RAR that was used when determining the extended RAPID that corresponds to the preamble.

In particular embodiments, each extended RAPID is determined from the combination of two bits from one of the RARs and six bits from the subheader that corresponds to said one of the RARs.

Certain embodiments of the present disclosure may provide one or more technical advantages. For example, certain embodiments support the new NPRACH numerology by the MAC layer by providing a unique RAPID for each subcarrier, e.g., an extended RAPID. By providing a unique RAPID, misinterpretation and collisions between UEs following the new numerology may be avoided or reduced. As another example, certain embodiments may provide extended RAPID for UEs following the new numerology without impacting UEs following the old numerology, e.g., by providing indications indicating the numerology used and/or providing an orthogonal RAPID space for each category. As yet another embodiment, certain embodiments provide an extended RAPID by combining bits from a MAC subheader and the corresponding MAC RAR. As a result, no additional overhead may be necessary and the basic structure of MAC subheaders and RARs may be maintained while accommodating the new numerology.

Certain embodiments may have none, some, or all of the above-recited advantages. Other advantages may be readily apparent to one having skill in the art.

BRIEF DESCRIPTION OF THE DRAWINGS

For a more complete understanding of the disclosed embodiments and their features and advantages, reference is now made to the following description, taking in conjunction with the accompanying drawings, in which:

FIGS. 1A and 1B illustrate example structures for a Medium Access Control (MAC) subheader and a MAC Random Access Response (RAR), in accordance with certain embodiments;

FIG. 2 illustrates an example structure of a MAC Protocol Data Unit (PDU) consisting of a MAC header and MAC RARs, in accordance with certain embodiments;

FIG. 13 is a flowchart illustrating a third method implemented in a communication system, in accordance with certain embodiments;

FIG. 14 is a flowchart illustrating a fourth method implemented in a communication system, in accordance with certain embodiments;

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As discussed above, the new numerology includes up to 144 subcarriers, whereas the number of bits available in legacy MAC PDU subheaders only allows specifying up to 64 unique subcarriers. Certain aspects of the present disclosure and their embodiments may provide solutions to these or other challenges. In certain embodiments, the RAPID definition for enhanced NPRACH is extended to 8 bits in order to be able to have a unique RAPID for each of the 144 subcarriers according to the agreed new NPRACH numerology. The present disclosure contemplates various embodiments for extending the number of RAPID bits and maintain backwards compatibility in the existing message structure. For example, certain embodiments use 4 additional bits (for example, in the RAR message, the padding region of MAC PDU, or from additional MAC subheader) to extend the RAPID value space for increased number of PRACH subcarriers/preambles.

Although certain embodiments described herein use NB-IoT as an example (because the discussion is ongoing in the 3GPP feNB-IoT WI for NPRACH reliability and range enhancements), the principles described herein could be applied also to, for example, LTE(-M) for extended RAPID value space or other suitable radio access technologies (RATs).

First Set of Embodiments: Introduction of a New MAC Subheader

Figure 3:
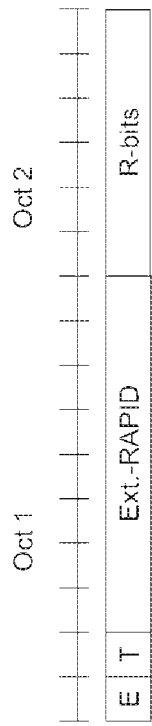
FIG. 3 illustrates an example extended MAC subheader with an eight-bit Random Access Preamble Identifier (RAPID), in accordance with certain embodiments.

In certain embodiments, a new MAC subheader is defined for Random Access Response (RAR) to support Rel-15 enhanced NPRACH. To still be octet-aligned, but to have 8 bits for the RAPID field, the new subheader may be 16 bits. Also, the E- and T-fields are maintained, thereby requiring a total 10 bits. In some embodiments, the remaining 6 bits could be reserved. FIG. 3 illustrates an example extended RAPID subheader having 16 bits, according to certain embodiments.

As a result, there may be separate subheaders for Rel-13 NPRACH and the new NPRACH numerology, which may raise backward-compatibility issues. However, if the Rel-15 RARs are transmitted exclusively in MAC Random Access (RA) response PDU that is not a problem. In this case there would be separate MAC RA response PDUs transmitted for Rel-13 and Rel-15 RARs, respectively, in the RA-window.

In this manner, an octet-aligned subheader may be provided that includes sufficient bits allocated to RAPID to specify the up to 144 different subcarriers. Legacy compatibility may be maintained by separating RARs into separate MAC PDUs based on whether the new subheader or the legacy 8-bit subheader is used.

Second Set of Embodiments: Adapting with the Existing MAC Subheader

In certain embodiments, the old/conventional MAC subheader may also be used for the new NPRACH numerology and extended RAPID range. However, to ensure backwards compatibility with Rel-13 NPRACH numerology and RAPID, 48 RAPID values should be reserved for Rel-13 UEs from the RAPID field in the MAC subheader. As the RAPID subheader is 6 bits, up to 64 different RAPID values may be indicated, thus after reserving 48 for Rel-13, 16 values can be used for the new numerology. In practice, this means, that 4 bits from one old MAC subheader may be used for the new numerology, therefore in order to have a total 8 bits for the new RAPID, at least 4 more bits are needed.

As only (up to) 48 values out of 64 would be reserved for Rel-13, the remaining 16 combinations (or more) would be outside of Rel-13 RAPID space. Therefore, the Rel-13 UEs should be able to recognize when a certain RAPID is not meant for it. For example, using 6 bits, the value space between '000000' and '101111' contains 48 values, e.g., the amount needed to be reserved for Rel-13 RAPID. The remaining 16 values, from '110000' to '111111' may be used for extended RAPID. In this example, the RAPID starting with '11' therefore indicates that this RAPID is for the extended RAPID, and the Rel-13 UEs would know not to care about RAPID, which starts with '11'. Note that this is merely one such implementation that is contemplated herein and the differentiation does not necessarily need to be the '11'-bits in the beginning in the RAPID. In some embodiments, the differentiation between the new numerology and Rel-13 (legacy) numerology may be based on the network configuration that designates which RAPIDs are designated to Rel-13 'old numerology' and which RAPIDs may be used for the extended RAPID. However, as noted in 3GPP TS 36.321, for NB-IoT, the Random Access Preamble IDentifier field corresponds to the start subcarrier index. This means that the values starting from '000000' and up to '101111' may be reserved for Rel-13 RAPID for NB-IoT.

Example Embodiment 2a: Use the Reserved Bits in the RAR Message

In certain embodiments, the extended RAPID is supported by using reserved bits in the RAR message to extend the RAPID field in the subheader. For example, the RAR message may include fields for reserved ('R') bits: 1 'R' bit in Octet 1, and 5 bits in Octet 4, see e.g., FIG. 1B. In some embodiments, 4 bits from the MAC subheader may be used for extended RAPID, therefore 4 additional bits may be needed for extended RAPID to accommodate the greater number of subcarriers. In some embodiments, these 4 bits may be the 4 most significant bits from the 'R' bits in Octet 4 to indicate the extended RAPID.

In certain embodiments, less than 4 bits may be required for extended RAPID. For example, if all 6 bits of the subheader are used for extended RAPID, only 2 additional bits may be needed to accommodate the new numerology. In some embodiments, those 2 bits are bits from the RAR that are normally reserved ('R' bits). In these embodiments, a separate indication may be provided to ensure there is not confusion between the legacy and new numerology-capable UEs. For instance, the wireless device may transmit the preamble that includes an indication that the wireless device is capable of using the new numerology. The network node may then may indicate an extended RAPID using bits in the RAR message in addition to the bits in the subheader. If no such indication is provided, the network node may send the RAPID according to the legacy configuration. In this manner, a combination of bits from the RAR and corresponding message may be used to accommodate the new numerology implemented with an increased number of subcarriers.

Example Embodiment 2b: Use Two Legacy Subheaders to Indicate Extended RAPID

In certain embodiments, two MAC subheaders may be used to indicate the extended RAPID. Several MAC subheaders can be included in the MAC header of a MAC PDU by using the 'E'-field in the subheaders. For example, the 'E' field set to '1' may indicate that another subheader will follow and setting it to '0' indicates that this is the last subheader and the actual RAR-messages will follow.

As an example, if in a MAC subheader the RAPID field indicates an extended RAPID value (e.g., it does not belong to the reserved values for Rel-13 UEs), the next MAC subheader may include the latter part of the extended RAPID in its RAPID-field. Accordingly, the MAC subheaders with extended RAPID would come in pairs (e.g., two MAC subheaders may be needed to indicate one extended RAPID). UEs with extended RAPID would expect to receive MAC subheaders in pairs, thus two MAC subheaders may be addressed to one UE with extended RAPID.

This configuration may also be backwards-compatible. For example, there would be no difference in using the 'E'-field as in legacy MAC subheaders: If 'E'-field is set to '1', another subheader will follow, and if it is set to '0', this is the last subheader. Rel-13 UEs would know to skip to the next subheader when the 'E'-field is set, and the RAPID-field doesn't match to its RAPID (such as when the RAPID field indicates an extended RAPID).

As described in the description for MAC PDU in 3GPP TS 36.321, each subheader should correspond to a MAC RAR except for the Backoff Indicator subheader. If two MAC subheaders are used for one RAR, there still should be equivalent MAC RARs for both of these subheaders. In certain embodiments, two MAC RARs for one UE with extended RAPID may be used in the following ways:
1. The two MAC RARs would be identical, and therefore could be used as an additional repetition to improve the UEs acquisition probability. This could be beneficial especially when the NPRACH range is extended and the UE is in deep coverage.
2. The second (or the first) MAC RAR corresponding to the other MAC subheader could be filled with Padding bits, or these bits could be reserved for some other purpose to that specific UE in the RAR message.

In certain embodiments, the 'E'-flag of the subheader is used to combine a second subheader's RAPID field with the first one. For example, if the first subheader's RAPID field starts with '11' (an example of a differentiation between Rel-13 RAPID and extended RAPID, which could also be indicated otherwise, such as staring the RAPID field with '00' or using some other type of indication), and the 'E'-flag is set, and the second subheader's RAPID field also starts with the same '11', a UE with extended RAPID would read both subheaders and combine the last 4 bits (after the '11') in each subheader's RAPID field to determine the extended RAPID.

Figure 4:
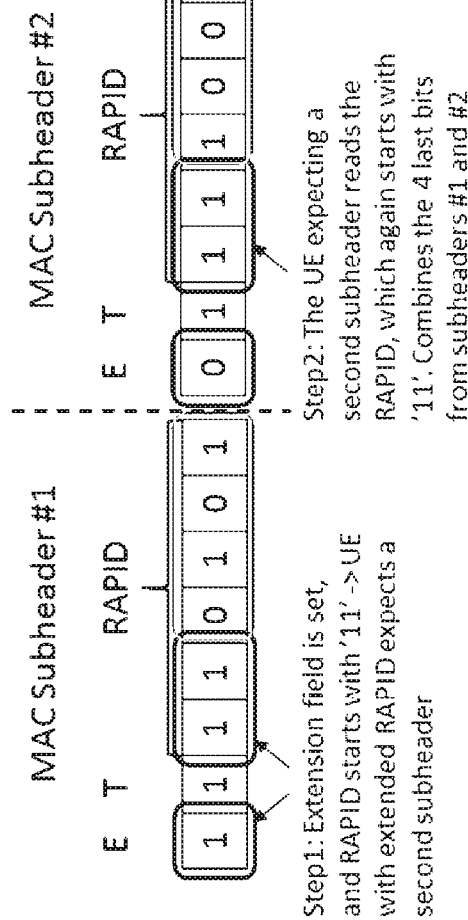
FIG. 4 illustrates an example procedure to combine bits from two subheaders to obtain an extended RAPID, in accordance with certain embodiments.

An example procedure of using two MAC subheaders to provide an extended RAPID is illustrated in FIG. 4, according to certain embodiments. At a first step, the extension field may be set and the subheader may also indicate that an extended RAPID is to be expected by combining with a subsequent subheader (e.g., beginning rapid bits with '11' or some other indication). At step 2, the UE expecting the second subheader reads the RAPID and obtains the remaining bits for the extended RAPID. At step 3, the UE may combine the RAPID bits from the two subheaders to obtain an extended RAPID, e.g., having 8 bits.

Example Embodiment 2c: Use Padding

In certain embodiments, the padding region in the end of the MAC PDU is used to provide extended RAPID. This region is interpreted as padding by Rel-13 UEs (indicated by the first octet after the RAR with a subheader where the E bit is set to 0) and they disregard it when receiving the MAC PDU, therefore using this padding region would not introduce any backwards-compatibility issues. Although the size of the padding is not defined, padding size is implicitly based on the TB size, the size of MAC header, and the number of RARs. For example, UEs with extended RAPID can check the 4 bits from the MAC subheader and read the remaining 4 bits from the padding. If there are multiple MAC subheaders for UEs with extended RAPID, the order of the bits in the padding region could follow the order of the MAC subheaders with extended RAPID (e.g., the first 4 bits in the padding region is meant to be combined with the RAPID in the first MAC subheader with extended RAPID, the second 4 bits in the padding region is meant to be combined with the RAPID in the second MAC subheader with extended RAPID, etc.).

Figure 5:
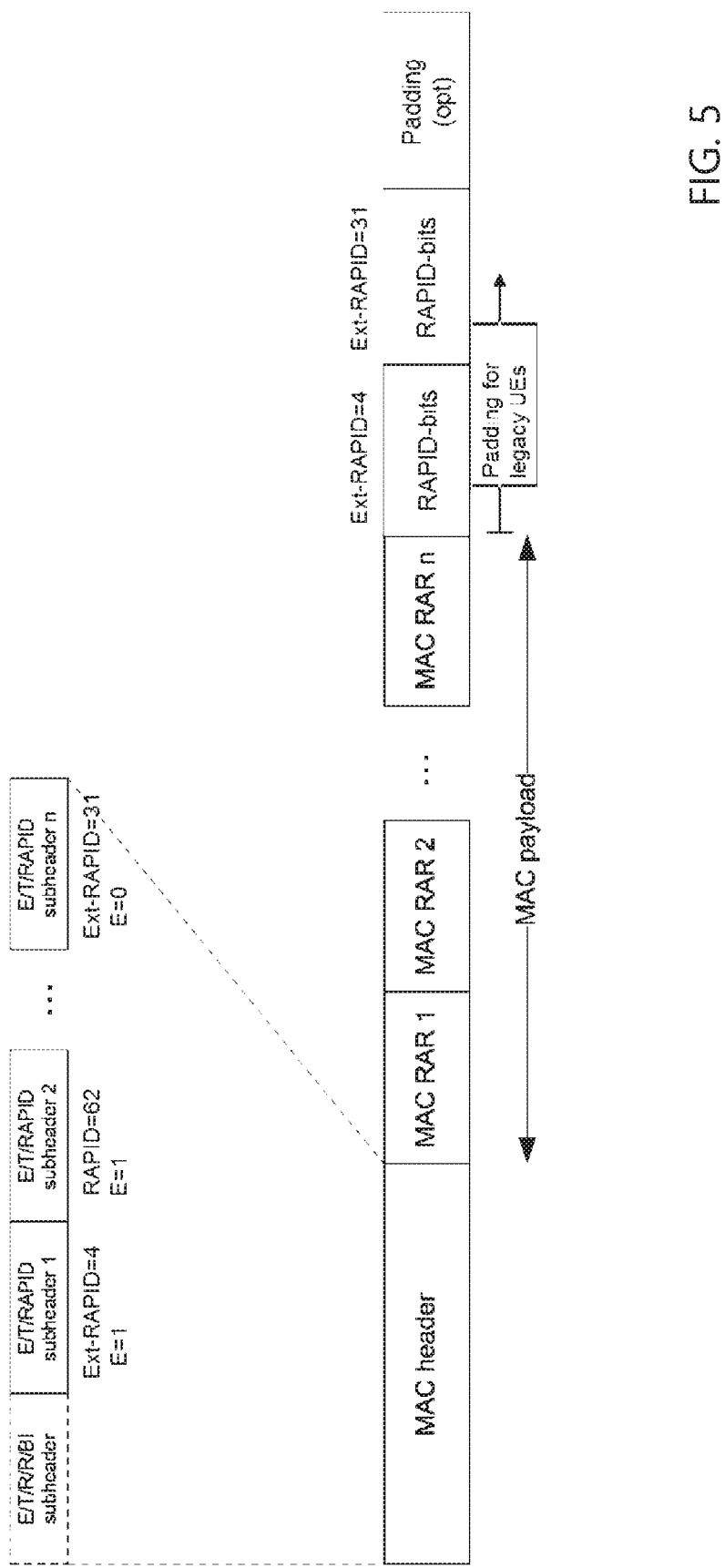
FIG. 5 illustrates an example structure of a MAC PDU wherein padding bits are used to provide addition bits to provide extended RAPID, in accordance with certain embodiments.

FIG. 5 illustrates the suggested MAC PDU structure for using padding for extended RAPID, according to certain embodiments. FIG. 5 may be interpreted as an extension of FIG. 2 with padding being used as extension bits for the extended RAPID used in addition to the bits in the subheaders.

Third Set of Embodiments

Currently, for NB-IoT, the Random Access Preamble IDentifier field corresponds to the start subcarrier index. That is, the RAPID is defined with absolute values from 0 to 47. But for the RAPID for the 1.25 kHz subcarrier spacing is defined with respect to a predefined starting point. That is, instead of using absolute values from 0 to 143, a starting point can be predefined, and the RAPID can be calculated with respect to the starting point.

A non-exclusive example is given as follows. Assuming a NPRACH configuration where the legacy 3.75 kHz is configured together with the 1.25 kHz NPRACH at the same starting point. The legacy 3.75 kHz NPRACH spans 12 subcarriers, and the 1.25 kHz NPRACH spans 36 subcarriers.

In certain embodiments, the relative starting point of the 1.25 kHz NPRACH region may be indicated and RAPID is defined relative to the reference starting point. In this example, if the indicate RAPID ID is 0 for 1.25 kHz, then the UE may choose the absolute preamble 36 and assume it is his RAPID.

Notice that in the downlink control information (DCI) that schedules RAR, there are two fields, in total 5 bits, that are reserved according to 3GPP TS 36.211 as follows: "When the format N1 CRC is scrambled with a RA-RNTI or a G-RNTI, then the following fields among the fields above are reserved for RA-RNTI and not present for G-RNTI:

New data indicator

HARQ-ACK resource".

In certain embodiments, some of the bits in the field can be used to indicate the relative staring point of the 1.25 kHz RAPID ID. These fields are only understandable by the Rel-15 UE, and in order to avoid confusion for the Rel-13 UE, the interpretation RAPID ID for Rel-15 UEs may be redefined, e.g., by using the values that are not used by Rel-13 UEs first. Accordingly, confusion or misinterpretation for Rel-13 UEs may be mitigated.

Figure 6:
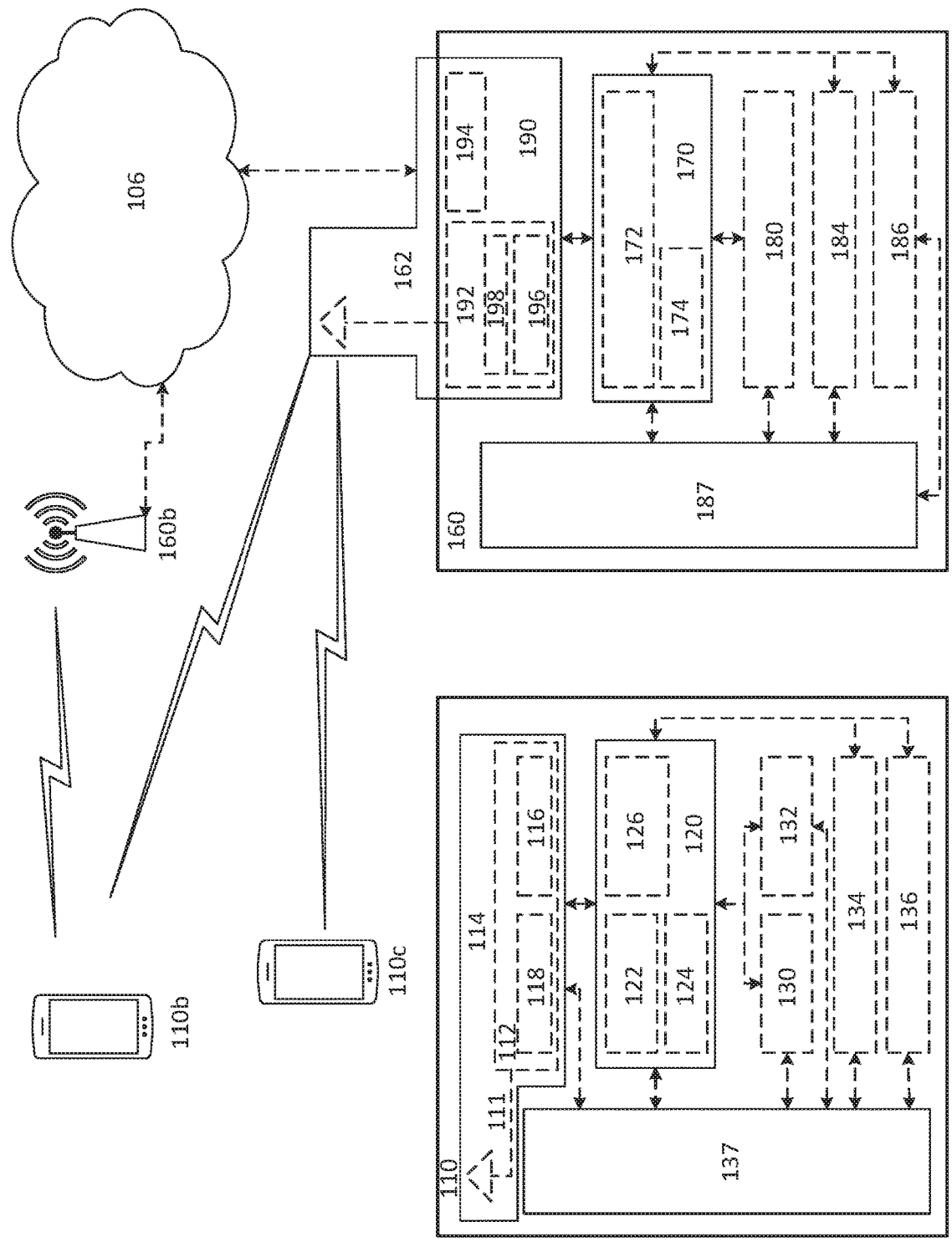
FIG. 6 illustrates an example wireless network, in accordance with certain embodiments.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 160 includes processing circuitry 170, device readable medium 180, interface 190, auxiliary equipment 184, power source 186, power circuitry 187, and antenna 162. Although network node 160 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and an RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 6 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 7:
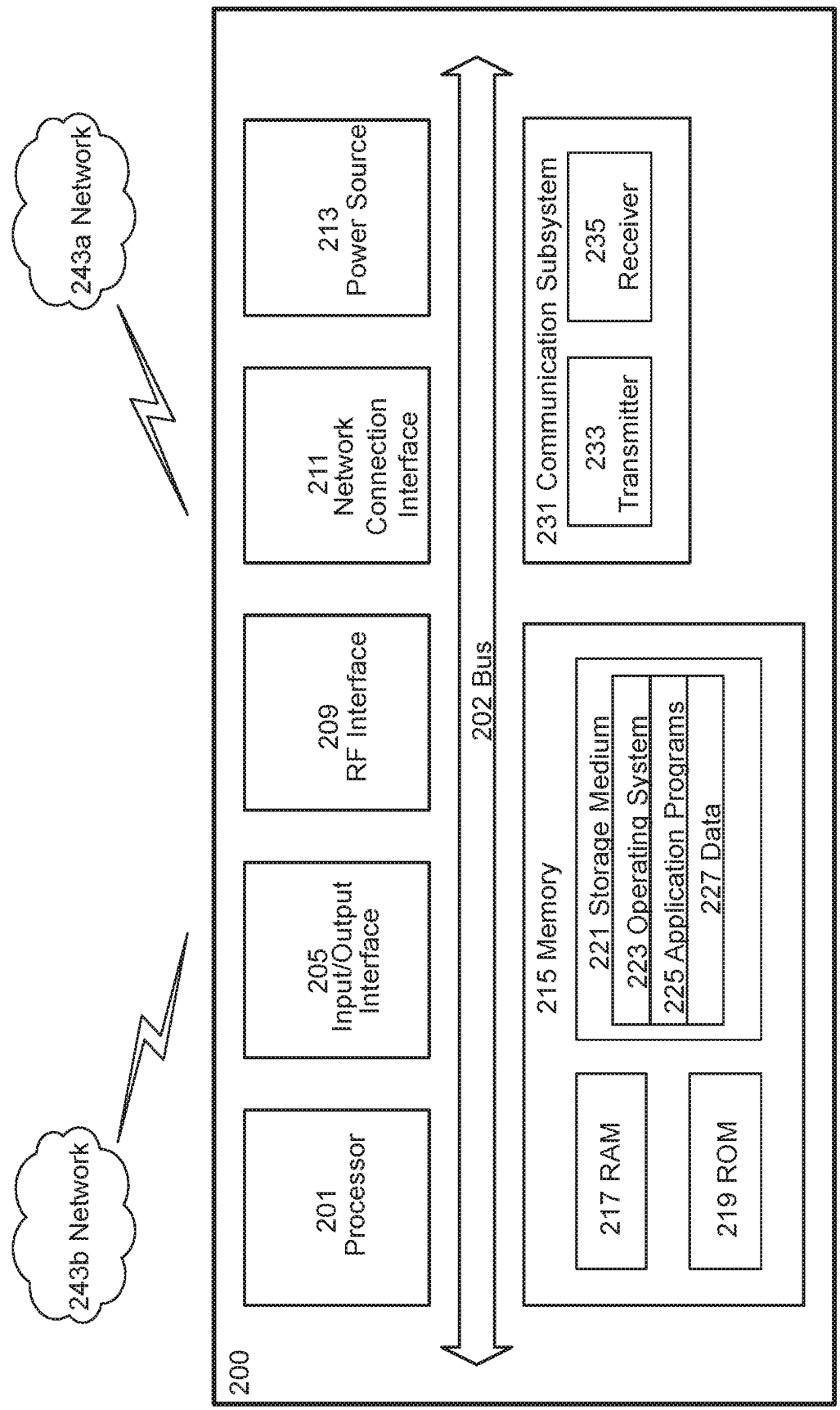
FIG. 7 illustrates an example user equipment, in accordance with certain embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 7, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 7, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 8:
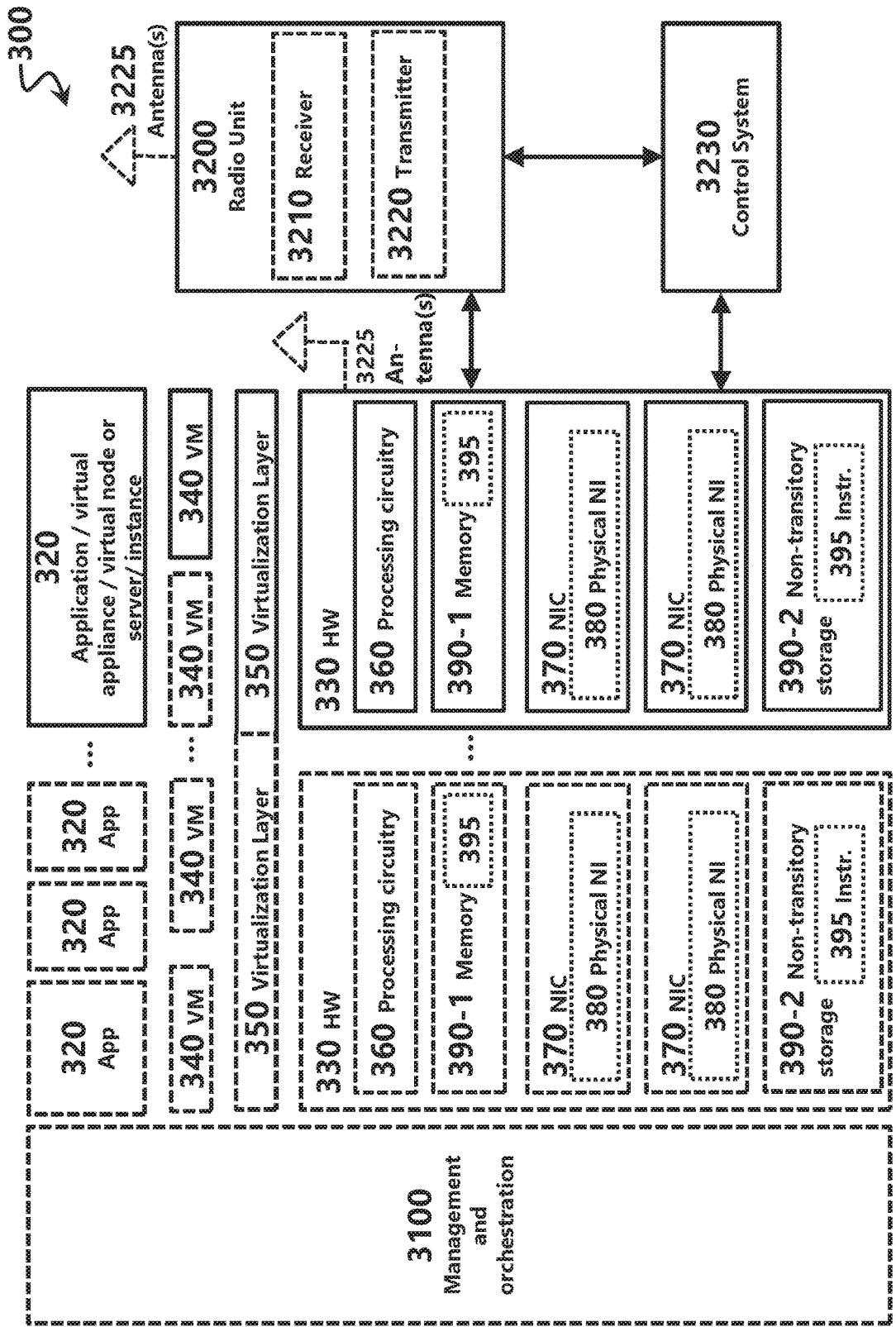
FIG. 8 illustrates an example virtualization environment, in accordance with certain embodiments.

FIG. 8 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 8, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 8.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be affected with the use of control system 3230 which may alternatively be used for communication between the hardware nodes 330 and radio units 3200.

Figure 9:
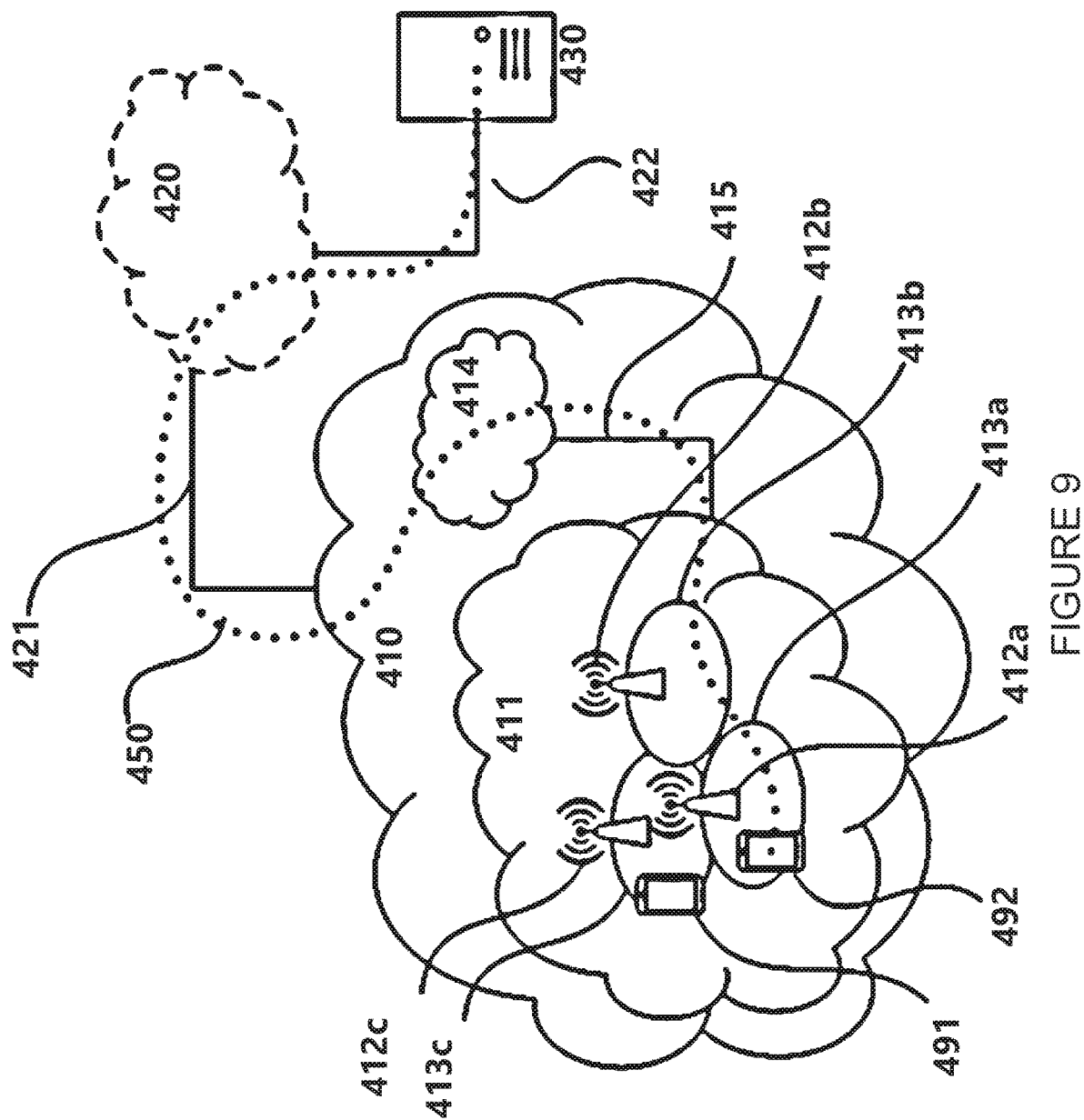
FIG. 9 illustrate an example telecommunication network connected via an intermediate network to a host computer, in accordance with certain embodiments.

With reference to FIG. 9, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 10) served by base station 520. Communication interface 526 may be configured to facilitate connection 560 to host computer 510. Connection 560 may be direct or it may pass through a core network (not shown in FIG. 10) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 10:
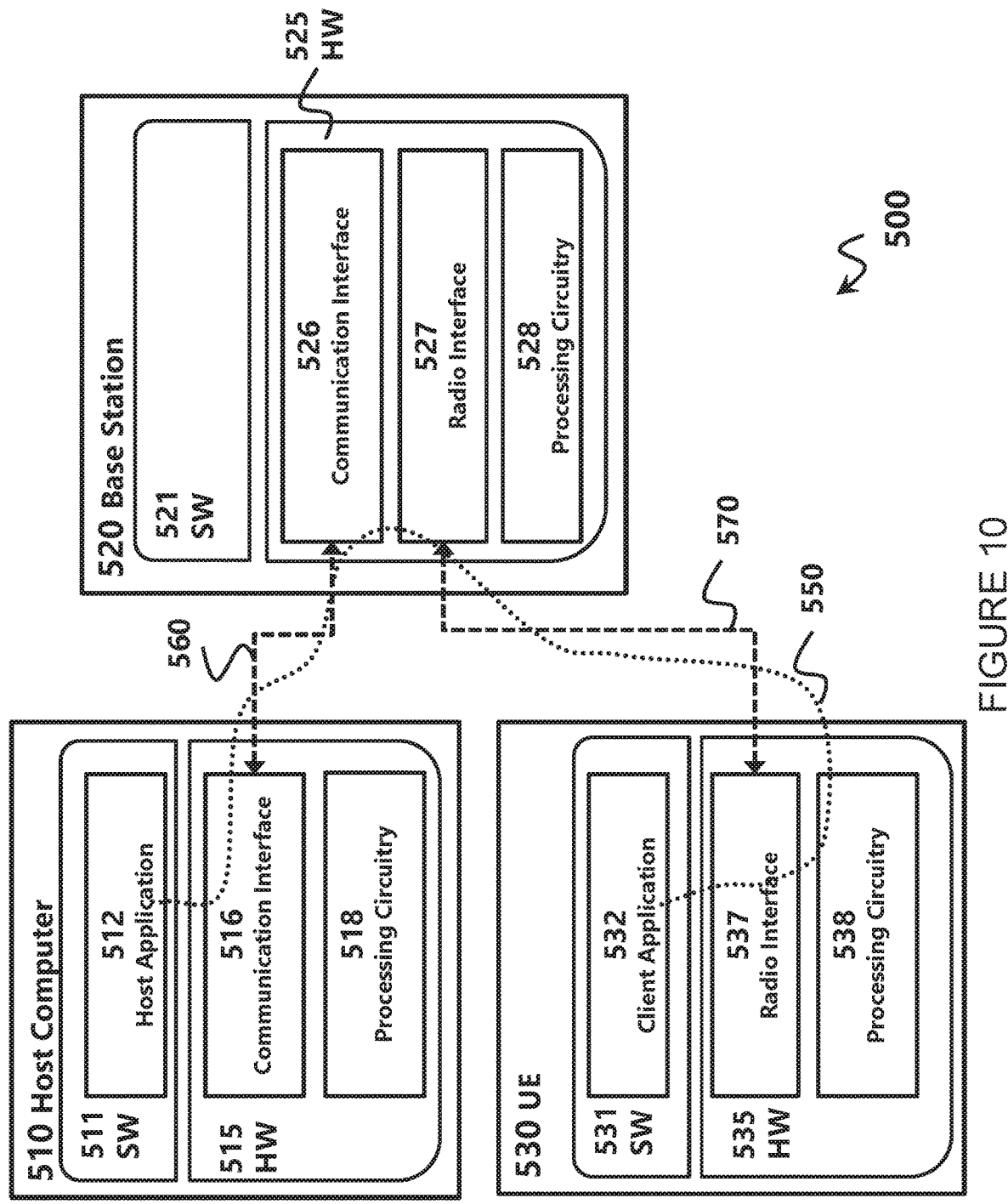
FIG. 10 illustrates an example host computer communicating via a base station with a user equipment over a partially wireless connection, in accordance with certain embodiments.

It is noted that host computer 510, base station 520 and UE 530 illustrated in FIG. 10 may be similar or identical to host computer 430, one of base stations 412a, 412b, 412c and one of UEs 491, 492 of FIG. 9, respectively. This is to say, the inner workings of these entities may be as shown in FIG. 10 and independently, the surrounding network topology may be that of FIG. 9.

In FIG. 10, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 11:
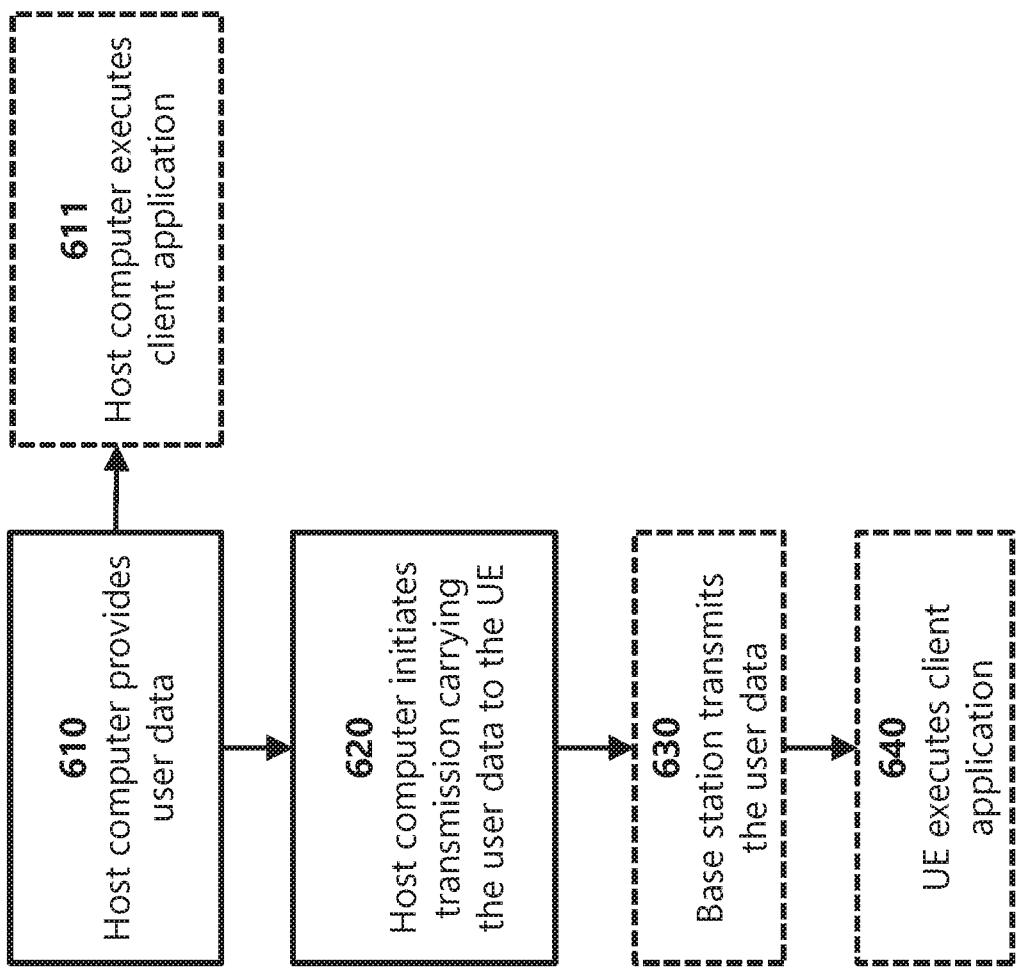
FIG. 11 is a flowchart illustrating an example method implemented in a communication system, in accordance certain embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 12:
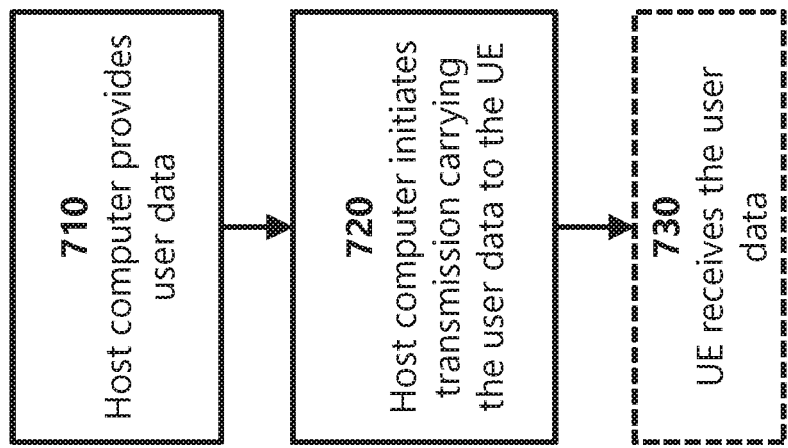
FIG. 12 is a flowchart illustrating a second example method implemented in a communication system, in accordance with certain embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 15:
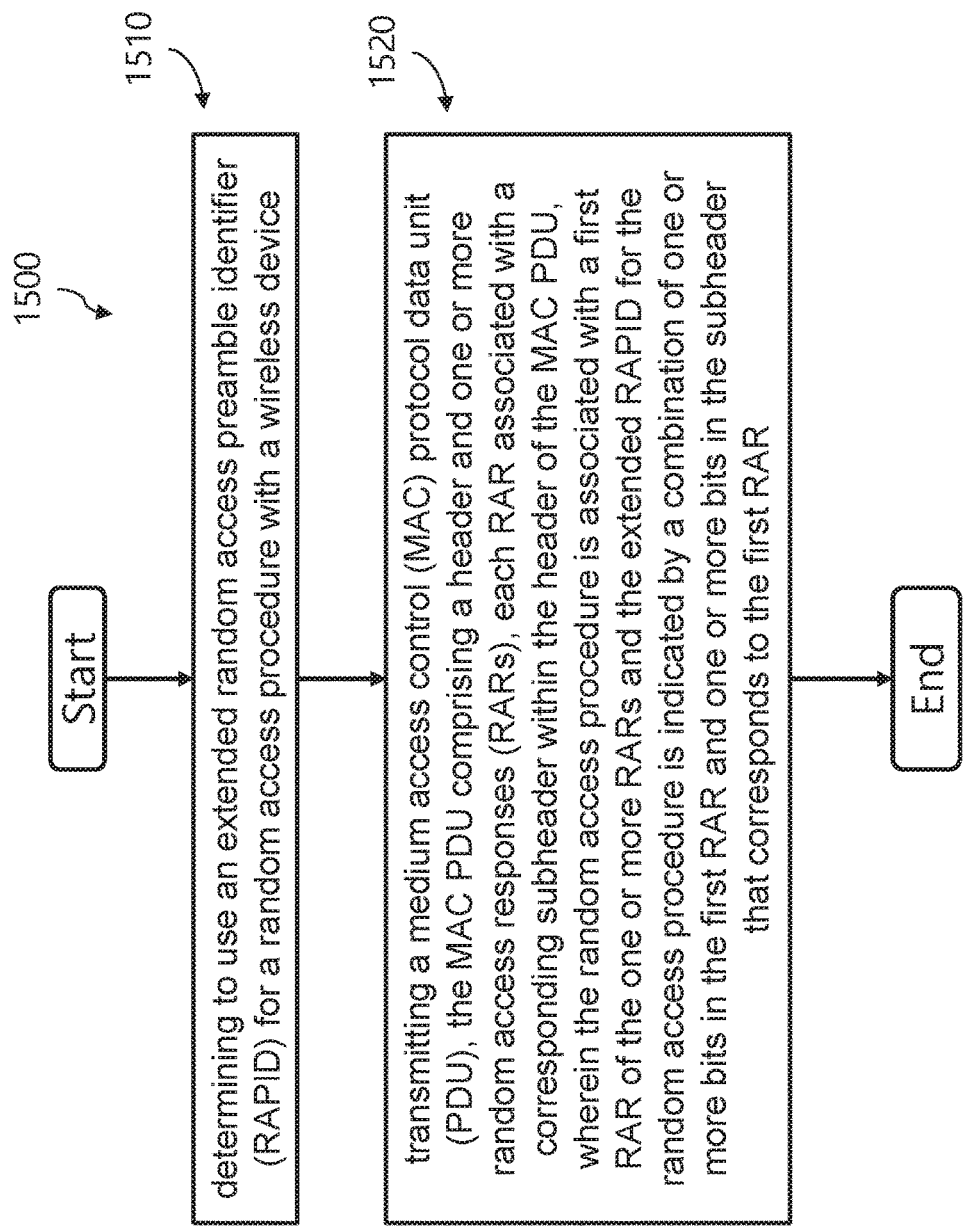
FIG. 15 illustrates an example method performed by a network node, in accordance with certain embodiments.

FIG. 15 illustrates an example flowchart for a method 1500 for use in a network node, such as network node 160, hardware node 330, base station 412, or base station 520 described above. Method 1500 may begin at step 1510, wherein the network node determines to use an extended RAPID for a random access procedure with a wireless device. For example, the network node may receive a preamble from the wireless device with the knowledge that wireless device is capable of receiving or using the extended RAPID. For example, the preamble received from the wireless device may indicate that the wireless device is capable of using an extended RAPID. As another example, the network node may receive configuration information from the network indicating that the wireless device is capable of using extended RAPID and, based on identifying the wireless device, determine to use the extended RAPID.

In particular embodiments, determining to use the extended RAPID is based on a preamble received from the wireless device. As a specific example, determining to use the extended RAPID is based on receiving, from the wireless device, a preamble having a format indicating that the wireless device is capable of obtaining extended RAPID bits from a portion of a random access response that is reserved with respect to legacy wireless devices, e.g., as discussed above in reference to "Second Set of Embodiments: Adapting with the existing MAC subheader." In this manner, the network node may determine to use extended RAPID for the random access procedure for the wireless device.

At step 1520, the network node may transmit a MAC PDU. The transmitted MAC PDU may include a header and one or more random access responses. As described above, for example, with respect to FIG. 2, each random access response may be associated with a corresponding subheader within the header of the MAC PDU. The random access procedure for which the network node received the preamble in step 1510 may be associated with a first RAR of the one or more RARs in the MAC PDU. Further, the extended RAPID for the random access procedure may be indicated by a combination of one or more bits in the first RAR and one or more bits in the subheader that corresponds to the first RAR. In this manner, the network node may extend the number of RAPID bits to indicate a greater number of subcarrier or other numerology options by using bits outside the subheader that are still accessible to the wireless device. As a result, the network node may indicate a grant of resources that may be used by the wireless device that transmitted the preamble corresponding to the extended RAPID. For example, the network node may subsequently receive a connection request from the wireless device using the granted resources.

In certain embodiments, the extended RAPID is indicated by a combination of two bits in the first random access response and six bits from the subheader that corresponds to the first RAR. As an example, the extended RAPID may be indicated by one or more bits in the first random access response that are reserved with respect to legacy wireless devices, such as one or more bits (e.g., 2 bits) in the "R" field of octet 4 illustrated in FIG. 1B, in combination with one or more bits in the corresponding MAC PDU subheader, such as one or more bits (e.g., 6 bits) in the "RAPID" field of octet 1 illustrated in FIG. 1A. By transmitting a MAC PDU indicating that the RAR uses an extended RAPID or that the MAC PDU is reserved for the new numerology, the method enables a wireless device that is not capable of using extended RAPID to determine that the RAR may be ignored. As a result of method 1500, a random access procedure may be initiated using extended RAPID to accommodate the finer numerology.

In the above example, the "first" RAR simply refers to the RAR in the MAC PDU that is associated with the random access procedure for which the network node received the preamble in step 1510. The first RAR may correspond to any suitable RAR within the MAC PDU (e.g., RAR 1, RAR 2, . . . RAR n), depending on the embodiment. That is, the use of the word "first" permits, but does not require, the RAR to be the earliest transmitted RAR in the MAC PDU.

Figure 16:
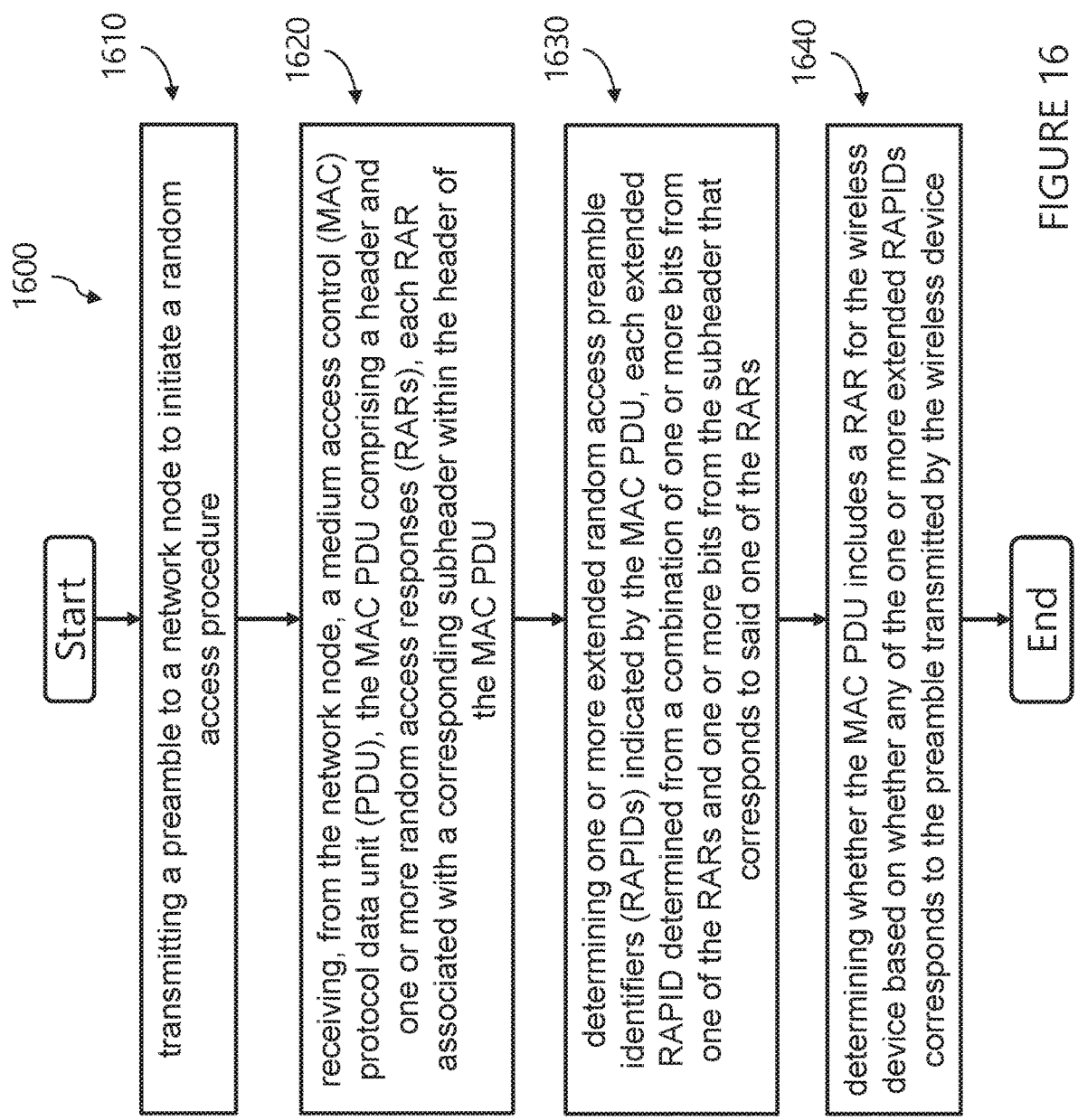
FIG. 16 illustrates an example method performed by a wireless device, in accordance with certain embodiments.

FIG. 16 illustrates an example flowchart for a method 1600 for use in a wireless device, such as wireless device 110, UE 200, 491, 492, or 530, or hardware node 330. Method 1600 may begin at step 1610, wherein the wireless device transmits a preamble to a network node to initiate a random access procedure. For example, the preamble may indicate that the wireless device is capable of using extended RAPID and may thus cause the network node to respond with an extended RAPID corresponding to the transmitted preamble if resources are available for the wireless device. In certain embodiments, the transmitted preamble indicates that the wireless device determines the extended RAPID using bits from a portion of a random access response that is reserved with respect to legacy wireless devices.

At step 1620, the wireless device may receive MAC PDU comprising a header and one or more random access responses. Each random access response is associated with a corresponding subheader within the header of the MAC PDU. The MAC PDU may be broadcast or transmitted to more than a single wireless device and may include RARs that are not intended for the wireless device. Thus, the wireless device may check the RAPID or extended RAPID to determine which, if any, RAR was intended for the wireless device.

At step 1630, the wireless device determines one or more extended RAPIDs indicated by the MAC PDU. Each extended RAPID may be determined from a combination of one or more bits from one of the RARs and one or more bits from the subheader that corresponds to said one of the RARs. In this manner, the wireless device may check what extended RAPIDs are present in the MAC PDU to determine whether there is a responsive identifier matching or corresponding to the preamble that the wireless device has transmitted.

At step 1640, the wireless device determines whether the MAC PDU includes a RAR for the wireless device based on whether any of the one or more extended RAPIDs determined in step 1630 corresponds to the preamble that was transmitted by the wireless device in step 1610. For example, if the wireless device transmitted a preamble that would result in an extended RAPID (e.g., extended RAPID "X"), then the wireless device may compare the extended RAPIDs received in step 1630 to determine if any of them match extended RAPID X. As discussed above, each of the extended RAPIDs received in step 1630 may be determined from the combination of one or more bits in a random access response and one or more bits in the subheader corresponding to that random access response.

In particular embodiments, each extended RAPID is indicated by a combination of two bits in the random access response and six bits from the corresponding subheader. As an example, the extended RAPID may be indicated by one or more bits in the first random access response that are reserved with respect to legacy wireless devices, such as one or more bits (e.g., 2 bits) in the "R" field of octet 4 illustrated in FIG. 1B, in combination with one or more bits in the corresponding MAC PDU subheader, such as one or more bits (e.g., 6 bits) in the "RAPID" field of octet 1 illustrated in FIG. 1A. In some embodiments, each extended RAPID is indicated using a different combination of bits. In this manner, an extended RAPID may be implemented and used by a wireless device to accommodate larger numerologies and/or a larger number of subcarriers.

If one of the extended RAPIDs received as part of the MAC PDU in step 1620 corresponds to the preamble transmitted to the network node in step 1610, the wireless device may use an uplink grant indicated in the random access response corresponding to the matching extended RAPID. That is, the wireless device may use the uplink grant indicated in the random access response from which one or more bits of the matching extended RAPID were determined in step 1630. In certain embodiments, using the uplink grant comprises transmitting a connection request to the network node using resources indicated in the uplink grant. In this manner, the wireless device may continue the random access procedure.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A method for use in a network node, comprising:
determining to use an extended random access preamble identifier (RAPID) for a random access procedure with a wireless device; and
transmitting a medium access control (MAC) protocol data unit (PDU), the MAC PDU comprising a header and one or more random access responses (RARs), each RAR associated with a corresponding subheader within the header of the MAC PDU;
wherein the random access procedure is associated with a first RAR of the one or more RARs and the extended RAPID for the random access procedure is indicated by a combination of one or more bits in the first RAR and one or more bits in the subheader that corresponds to the first RAR.

2. The method of claim 1, wherein determining to use the extended RAPID is based on a preamble received from the wireless device.

3. The method of claim 1, wherein determining to use the extended RAPID is based on receiving, from the wireless device, a preamble having a format indicating that the wireless device is capable of obtaining extended RAPID bits from a portion of a random access response that is reserved with respect to legacy wireless devices.

4. The method of claim 1, wherein the extended RAPID is indicated by a combination of two bits in the first RAR and six bits from the subheader that corresponds to the first RAR.

5. A network node comprising:
a memory configured to store instructions; and
processing circuitry configured to execute the instructions, wherein the network node is configured to:
determine to use an extended random access preamble identifier (RAPID) for a random access procedure with a wireless device; and
transmit a medium access control (MAC) protocol data unit (PDU), the MAC PDU comprising a header and one or more random access responses (RARs), each RAR associated with a corresponding subheader within the header of the MAC PDU;
wherein the random access procedure is associated with a first RAR of the one or more RARs and the extended RAPID for the random access procedure is indicated by a combination of one or more bits in the first RAR and one or more bits in the subheader that corresponds to the first RAR.

6. The network node of claim 5, wherein the network node is configured to determine to use the extended RAPID based on a preamble received from the wireless device.

7. The network node of claim 5, wherein the network node is configured to determine to use the extended RAPID based on receiving, from the wireless device, a preamble having a format indicating that the wireless device is capable of obtaining extended RAPID bits from a portion of a random access response that is reserved with respect to legacy wireless devices.

8. The network node of claim 5, wherein the extended RAPID is indicated by a combination of two bits in the first RAR and six bits from the subheader that corresponds to the first RAR.

9. A computer program product comprising a non-transitory computer readable medium storing computer readable program code, the computer readable program code comprises:
program code for determining to use an extended random access preamble identifier (RAPID) for a random access procedure with a wireless device; and
program code for transmitting a medium access control (MAC) protocol data unit (PDU), the MAC PDU comprising a header and one or more random access responses (RARs), each RAR associated with a corresponding subheader within the header of the MAC PDU;
wherein the random access procedure is associated with a first RAR of the one or more RARs and the extended RAPID for the random access procedure is indicated by a combination of one or more bits in the first RAR and one or more bits in the subheader that corresponds to the first RAR.

10. The computer program product of claim 9, wherein determining to use the extended RAPID is based on a preamble received from the wireless device.

11. The computer program product of claim 9, wherein determining to use the extended RAPID is based on receiving, from the wireless device, a preamble having a format indicating that the wireless device is capable of obtaining extended RAPID bits from a portion of a random access response that is reserved with respect to legacy wireless devices.

12. The computer program product of claim 9, wherein the extended RAPID is indicated by a combination of two bits in the first RAR and six bits from the subheader that corresponds to the first RAR.

13. A method for use in a wireless device, comprising:
transmitting a preamble to a network node to initiate a random access procedure;
receiving, from the network node, a medium access control (MAC) protocol data unit (PDU), the MAC PDU comprising a header and one or more random access responses (RARs), each RAR associated with a corresponding subheader within the header of the MAC PDU;
determining one or more extended random access preamble identifiers (RAPIDs) indicated by the MAC PDU, each extended RAPID determined from a combination of one or more bits from one of the RARs and one or more bits from the subheader that corresponds to said one of the RARs; and
determining whether the MAC PDU includes a RAR for the wireless device based on whether any of the one or more extended RAPIDs corresponds to the preamble transmitted by the wireless device.

14. The method of claim 13, wherein the transmitted preamble indicates that the wireless device determines the extended RAPID using bits from a portion of a random access response that is reserved with respect to legacy wireless devices.

15. The method of claim 13, further comprising:
if the extended RAPID corresponds to the preamble transmitted to the network node, transmitting a connection request to the network node using an uplink grant indicated in the RAR that was used when determining the extended RAPID that corresponds to the preamble.

16. The method of claim 13, wherein each extended RAPID is determined from the combination of two bits from one of the RARs and six bits from the subheader that corresponds to said one of the RARs.

17. A wireless device comprising:
a memory configured to store instructions; and
processing circuitry configured to execute the instructions; wherein the wireless device is configured to:
transmit a preamble to a network node to initiate a random access procedure;
receive, from the network node, a medium access control (MAC) protocol data unit (PDU), the MAC PDU comprising a header and one or more random access responses (RARs), each RAR associated with a corresponding subheader within the header of the MAC PDU;
determine one or more extended random access preamble identifiers (RAPIDs) indicated by the MAC PDU, each extended RAPID determined from a combination of one or more bits from one of the RARs and one or more bits from the subheader that corresponds to said one of the RARs; and determine whether the MAC PDU includes a RAR for the wireless device based on whether any of the one or more extended RAPIDs corresponds to the preamble transmitted by the wireless device.

18. The wireless device of claim 17, wherein the transmitted preamble indicates that the wireless device determines the extended RAPID using bits from a portion of a random access response that is reserved with respect to legacy wireless devices.

19. The wireless device of claim 17, wherein the wireless device is further configured to:
   if the extended RAPID corresponds to the preamble transmitted to the network node, transmit a connection request to the network node using an uplink grant indicated in the RAR that was used when determining the extended RAPID that corresponds to the preamble.

20. The wireless device of claim 17, wherein each extended RAPID is determined from the combination of two bits from one of the RARs and six bits from the subheader that corresponds to said one of the RARs.

21. A computer program product comprising a non-transitory computer readable medium storing computer readable program code, the computer readable program code comprises:
   program code for transmitting a preamble to a network node to initiate a random access procedure;
   program code for receiving, from the network node, a medium access control (MAC) protocol data unit (PDU), the MAC PDU comprising a header and one or more random access responses (RARs), each RAR associated with a corresponding subheader within the header of the MAC PDU;
   program code for determining one or more extended random access preamble identifiers (RAPIDs) indicated by the MAC PDU, each extended RAPID determined from a combination of one or more bits from one of the RARs and one or more bits from the subheader that corresponds to said one of the RARs; and
   program code for determining whether the MAC PDU includes a RAR for the wireless device based on whether any of the one or more extended RAPIDs corresponds to the preamble transmitted by the wireless device.

22. The computer program product of claim 21, wherein the transmitted preamble indicates that the wireless device determines the extended RAPID using bits from a portion of a random access response that is reserved with respect to legacy wireless devices.

23. The computer program product of claim 21, wherein the computer readable program code further comprises:
   program code for, if the extended RAPID corresponds to the preamble transmitted to the network node, transmitting a connection request to the network node using an uplink grant indicated in the RAR that was used when determining the extended RAPID that corresponds to the preamble.

24. The computer program product of claim 21, wherein each extended RAPID is determined from the combination of two bits from one of the RARs and six bits from the subheader that corresponds to said one of the RARs.

* * * * *